(12) United States Patent
Zhang et al.

(10) Patent No.: US 10,264,424 B2
(45) Date of Patent: Apr. 16, 2019

(54) INFORMATION PROCESSING METHOD AND CENTRAL CONTROL DEVICE

(71) Applicant: Lenovo (Beijing) Co., Ltd., Beijing (CN)

(72) Inventors: Chuanyu Zhang, Beijing (CN); Bibo Yang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 636 days.

(21) Appl. No.: 14/739,231

(22) Filed: Jun. 15, 2015

(65) Prior Publication Data

US 2016/0191267 A1    Jun. 30, 2016

(30) Foreign Application Priority Data

Dec. 30, 2014    (CN) .......................... 2014 1 0844300

(51) Int. Cl.
*H04W 4/50* (2018.01)
*H04L 29/08* (2006.01)

(52) U.S. Cl.
CPC .............. *H04W 4/50* (2018.02); *H04L 67/10* (2013.01)

(58) Field of Classification Search
None
See application file for complete search history.

(56) References Cited

U.S. PATENT DOCUMENTS

| 2012/0016528 | A1* | 1/2012 | Raman | .................. | G06F 9/5094 |
| | | | | | 700/291 |
| 2014/0067094 | A1 | 3/2014 | Park | | |
| 2014/0108936 | A1* | 4/2014 | Khosropour | .......... | G06F 9/4443 |
| | | | | | 715/735 |

(Continued)

FOREIGN PATENT DOCUMENTS

| CN | 1481119 | 3/2004 |
| CN | 103176445 | 6/2013 |

(Continued)

OTHER PUBLICATIONS

First Office Action dated May 27, 2017 (13 pages including English translation) out of Chinese priority Application No. 201410844300.8.

*Primary Examiner* — Joshua Joo
(74) *Attorney, Agent, or Firm* — Brinks Gilson & Lione; John C. Freeman

(57) ABSTRACT

An information processing method is described and includes establishing a first communication channel between a central control device and at least one smart home device through a first communication module of the central control device; downloading from a cloud device and installing an application program corresponding to the at least one smart home device; generating a first control instruction based on a control logic of a first application program upon obtaining description information of the first control instruction; and sending the first control instruction to a first smart home device corresponding to the first application program (Continued)

through the first communication channel so as to control the first smart home device to respond, wherein the description information of the first control instruction indicates changing a state of the first smart home device. A central control device is also described.

11 Claims, 3 Drawing Sheets

(56) References Cited

U.S. PATENT DOCUMENTS

| | | | | |
|---|---|---|---|---|
| 2014/0181683 A1* | 6/2014 | Lim | ............... | H04L 63/105 |
| | | | | 715/740 |
| 2015/0067080 A1* | 3/2015 | Cho | ............... | H04L 67/025 |
| | | | | 709/206 |
| 2015/0077231 A1 | 3/2015 | Kang | | |
| 2015/0249642 A1* | 9/2015 | Burns | ............... | H04L 12/66 |
| | | | | 726/4 |
| 2017/0068230 A1* | 3/2017 | Hagins | ............... | G05B 15/02 |
| 2017/0109999 A1* | 4/2017 | Cohn | ............... | G08B 25/003 |

FOREIGN PATENT DOCUMENTS

| | | |
|---|---|---|
| CN | 103309308 | 9/2013 |
| CN | 103957249 | 7/2014 |
| CN | 104135443 | 11/2014 |

* cited by examiner

INFORMATION PROCESSING METHOD AND CENTRAL CONTROL DEVICE

This application claims priority to Chinese Patent Application No. 201410844300.8 filed on Dec. 30, 2014, the entire contents of which are incorporated herein by reference.

The present disclosure relates to the technical field of home appliance control, in particular to an information processing method and a central control device.

BACKGROUND

As science and technology develop constantly, electronic technology has been developing rapidly, electronic products are increasingly diversified, and people also enjoy a variety of benefits obtained from the development of science and technology. Now, people can enjoy a comfortable life brought by the development of science and technology through all kinds of electronic devices. For example, an electronic device such as a mobile phone has become a dispensable part in people' lives. People are able to strengthen contact with others by means of calling or sending a message and so on through electronic devices such as a mobile phone and the like.

At present, smart home appliances develop more and more rapidly. There are a wide variety of smart home appliances, for example a smart fridge, a smart television and so on. Now, in order for unified control of the home appliances, control applications (APPs) corresponding to the respective home appliances are generally downloaded to the user's devices such as a mobile phone or a computer and the like. In particular, for the purpose of convenience, these APPs are always downloaded to the mobile phone, and then the home appliances are controlled by the mobile phone.

However, the current mobile phone has a larger storage space compared with the previous mobile phone, but it still has a limited storage space. If APPs corresponding to the home appliances are to be installed, a relatively large storage space is required. As a result, the storage space of the mobile home may be insufficient, or even it may occur that the mobile phone cannot install other required applications, or that it may be failed to install APPs of all home appliances.

SUMMARY

According to a first aspect of the present disclosure, there is provided an information processing method applicable to a central control device, comprising: establishing a first communication channel between the central control device and at least one smart home device through a first communication module of the central control device; downloading from a cloud device and installing an application program corresponding to the at least one smart home device; generating a first control instruction based on a control logic of a first application program upon obtaining description information of the first control instruction; and sending the first control instruction to a first smart home device corresponding to the first application program through the first communication channel so as to control the first smart home device to respond, wherein the description information of the first control instruction indicates changing a state of the first smart home device.

Optionally, before downloading from the cloud device and installing the application program corresponding to the at least one smart home device, the method further comprises: establishing a second communication channel between the central control device and the cloud device through a second communication module of the central control device.

Optionally, after downloading from the cloud device and installing the application program corresponding to the at least one smart home device, the method further comprises: obtaining the description information of the first control instruction from the cloud device through the second communication channel, wherein the description information of the first control instruction is generated upon the cloud device receiving sub description information of the first control instruction from a terminal device, the sub description information comprises information corresponding to user's operation on the terminal device.

Optionally, said generating a first control instruction based on a control logic of a first application program upon obtaining description information of the first control instruction comprises: operating on a first interactive interface of the first application program based on an operation logic indicated by the description information of the first control instruction, so as to control the first application program to generate the first control instruction for controlling the first smart home device according to a control logic of the first application program.

Optionally, the description information of the first control instruction is generated by: upon receiving the sub description information of the first control instruction, the cloud device analyzing and obtaining an intention of user's operation on the terminal device indicated by the sub description information, and converting the intention of the operation into the description information executable by the central control device to generate the first control instruction.

Optionally, the description information of the first control instruction is generated by: upon receiving the sub description information of the first control instruction, the cloud device searching for a central control device corresponding to the terminal device based on the sub description information; the cloud device determining that the central control device is connected with the first smart home device capable of responding to the first control instruction, based on the sub description information and the central control device; the cloud device obtaining the first application program installed on the central control device for controlling the first smart home device; the cloud device obtaining an operation logic of the first application program for generating the first control instruction; and the cloud device generating the description information of the first control instruction according to the operation logic of the first application program.

Optionally, the information processing method further comprises: establishing communication between the cloud device and the terminal device; the terminal device obtaining an operation interface of the cloud device, wherein the operation interface includes widgets corresponding to a plurality of smart home devices for user's operation; and the terminal device generating the sub description information of the first control instruction in response to a first operation in relation to a first widget on the operation interface.

According to a second aspect of the present disclosure, there is provided an information processing method applicable to a cloud device, comprising: establishing communication channels with a central control device and a terminal device, wherein the central control device connected with at least one smart home device; receiving sub description information of a first control instruction from the terminal device corresponding to user's operation on the terminal device; analyzing the sub description information to obtaining an intention of the user's operation on the terminal device; and converting the intention of the operation into description information of the first control instruction executable by the central control device to generate the first control instruction for controlling the at least one smart home device.

Optionally, upon the cloud device receiving sub description information from the terminal device, the method further comprises: the cloud device determining that the central control device is connected with a first smart home device capable of responding to the first control instruction, based on the sub description information and the central control device; the cloud device obtaining a first application program installed on the central control device for controlling the first smart home device; the cloud device obtaining an operation logic of the first application program for generating the first control instruction; and the cloud device generating the description information of the first control instruction according to the operation logic of the first application program.

Optionally, the cloud device providing an operation interface including widgets corresponding to a plurality of smart home devices for user's operation on the terminal device; and receiving the sub description information from the terminal device corresponding to a first operation in relation to a first widgets on the operation interface.

According to a third aspect of the present disclosure, there is provided a central control device, comprising: a first communication module configured to establish a first communication channel with at least one smart home device; a second communication module configured to establish a second communication channel with a cloud device; a downloading module configured to download from the cloud device and install an application program corresponding to the at least one smart home device; and a generating module configured to generate a first control instruction based on a control logic of a first application program upon receiving description information of the first control instruction, and send the first control instruction to a first smart home device corresponding to the first application program through the first communication channel so as to control the first smart home device to respond, wherein the description information of the first control instruction indicates changing a state of the first smart home device.

Optionally, the central control device further comprises an obtaining module configured to obtain the description information of the first control instruction from the cloud device through the second communication channel, wherein the description information is generated upon the cloud device receiving sub description information of the first control instruction from a terminal device, the sub description information is corresponding to user's operation on the terminal device.

Optionally, the generating module is further configured to: operate on a first interactive interface of the first application program based on an operation logic indicated by the description information of the first control instruction so as to control the first application program to generate the first control instruction for controlling the first smart home device according to a control logic of the first application program.

Optionally, the description information of the first control instruction comprises information generated by: upon receiving the sub description information of the first control instruction, the cloud device analyzing and obtaining an intention of user's operation on the terminal device indicated by the sub description information, and converting the intention of the operation into the description information executable by the central control device to generate the first control instruction.

Optionally, the description information of the first control instruction comprises information generated by: upon receiving the sub description information of the first control instruction, the cloud device searching for a central control device corresponding to the terminal device based on the sub description information; the cloud device determining that the central control device is connected with the first smart home device capable of responding to the first control instruction, based on the sub description information of the first control instruction and the central control device; the cloud device obtaining the first application program installed on the central control device for controlling the first smart home device; the cloud device obtaining an operation logic of the first application program for generating the first control instruction; and the cloud device generating the description information of the first control instruction according to the operation logic of the first application program.

DETAILED DESCRIPTION

Figure 1:
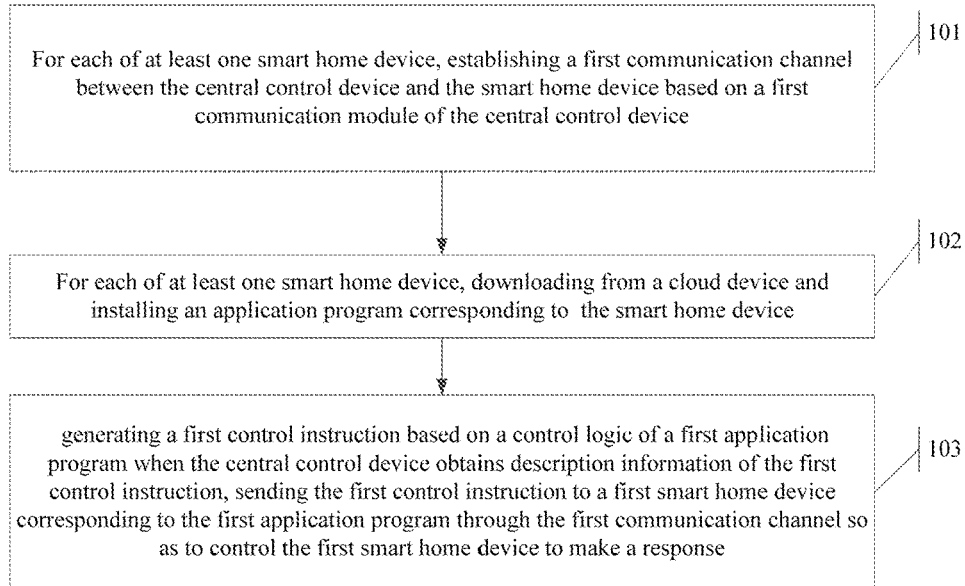
FIG. 1 is a major flowchart of an information processing method at a central control device in an embodiment of the present disclosure.

In embodiments of the present disclosure, there is provided an information processing method applicable to a central control device, the information processing method comprises: for each of at least one smart home device, establishing a first communication channel between the central control device and the smart home device based on a first communication module of the central control device; for each of the at least one smart home device, downloading from a cloud device and installing an application program corresponding to the smart home device; and generating a first control instruction based on a control logic of a first application program when obtaining description information of the first control instruction; and sending the first control instruction to a first smart home device corresponding to the first application program through the first communication channel so as to control the first smart home device to make a response; wherein the description information of the first control instruction is used to represent a change of a device state of the first smart home device.

In the embodiments of the present disclosure, each of the at least one smart home device has a first control mode and a second control mode, the first control mode is a control mode in response to receive a user operation, and the second control mode is a control mode in response to receive a control instruction sent by the central control device connected thereto;

The central control device in the embodiment of the present disclosure can download from the cloud device and installs the application programs corresponding to the respective smart home devices, that is, the application programs corresponding to the smart home devices can be installed in the central control device, for example, the central control device may be a smart router or may be other devices, so that it does not need to install the application documents corresponding to the smart home devices in the mobile phone, which saves the storage space of the mobile phone greatly. At the same time, the central control device generally has a relatively large storage space, and it is enough for application programs corresponding to the smart home devices to be installed, which is more convenient for the user's use.

In addition, when receiving the description information of the first control instruction, the central control device can generate automatically the first control instruction based on the control logic of the first application program, and send the first control instruction to the corresponding first smart home device so as to control the first smart home device to make a response. That is, after the application programs corresponding to the smart home devices are installed in the central control device, the smart home device can be controlled through the central control device, and thus the smart home devices can be normally controlling as the same as the way when installing the application programs in the mobile phone.

In order to make the purpose, technical solutions and advantages of the embodiments of the present disclosure more clear, the technical solutions in the embodiments of the present disclosure will be described clearly and completely by combining with the accompanying figures in the embodiments of the present disclosure. Obviously, the embodiments described below are a part of embodiments of the present disclosure instead of all the embodiments. Based on the embodiments of the present disclosure, all the other embodiments obtained by those skilled in the art without making any inventive labor belong to the scope sought protection in the present disclosure.

The central control device in the embodiments of the present disclosure may be for example a smart router or may be an electronic device of other type. The embodiments of the present disclosure do not limit the implementation form of the specific central control device.

The smart home appliance in the embodiments of the present disclosure may be home devices being capable of being controlled by application programs, for example a smart television, a smart fridge, a smart washing machine, a smart air conditioner, a smart electric cooker, and a smart lamb and so on, to which the present disclosure does not make any limitation.

The terminal device in the embodiments of the present disclosure may be different electronic devices, for example a mobile phone, a tablet computer (PAD), a personal computer (PC) and so on, to which the present disclosure does not make any limitation.

The cloud device in the embodiments of the present disclosure may be for example a cloud server.

In addition, the term "and/or" in this disclosure is just an association relationship that describes an associated object, and indicates there can be three relationships, for example, A and/or B may indicate the following three cases: only A exists; A and B exist simultaneously; and only B exists. In addition, the character "/" in the present disclosure generally represents that the associated objects before and after the character "/" has a relationship of "or", unless otherwise noted.

Preferable implementations of the present disclosure will be described in detail by combining with the accompanying figures.

Referring to FIG. 1, an information processing method applicable to a central control device is provided in an embodiment of the present disclosure. Major flows of the method are described as follows.

At Step 101: for each of at least one smart home device, a first communication channel is established between the central control device and the smart home device based on a first communication module of the central control device.

In the embodiment of the present disclosure, each of the at least one smart home device has a first control mode and a second control mode, the first control mode is a control mode in response to receive a user operation, and the second control mode is a control mode in response to receive a control instruction sent by the central control device connected thereto.

For example, each home may have one or more central control devices. In general, one home will use one central control device. This central control device can establish communication channels with at least one smart home device in the home through the first communication module respectively. In the embodiment of the present disclosure, all communication channels between the central control devices and the smart home devices are generally called as a first communication channel. In this way, the central control device can control the smart home devices having established the first communication channel with the central control device. Herein, the first communication channel is either a wireless channel or a wired channel, that is, the central control device and the smart home device can be connected in a wireless way or in a wired way.

As described above, in the embodiment of the present disclosure, each smart home device can support two control modes, wherein the first control mode is a control mode in response to receive a user operation, that is, the user can control the smart home device directly, without the central control device. For example, for a smart air conditioner, the user can use directly a control device such as a remote controller to control the smart air conditioner, or the user can press down directly keys in the smart air conditioner to control the smart air conditioner. The controlling processes for either using a control device such as a remote controller to control the smart air conditioner or controlling the smart air conditioner directly through operating an input device such as keys on the smart air conditioner do not need the participation of the central control device. For the smart home device, this is one of the control modes supported by the smart home device, i.e., the first control mode.

In addition, the central control device can send a control instruction to a smart home device connected with the central control device so as to control the smart home device. Such control mode is the other control mode supported by the smart home device, i.e., the second control mode.

At Step 102: for each of the at least one smart home device, an application program corresponding to the smart home device is downloaded from a cloud device and installed in the central control device.

The central control device can download an application program corresponding to a smart home device from the cloud device under the control of the user. One possible application scene is: after a connection between the central control device and a smart home device is completed, the central control device can push a piece of information to the user. For example, the central control device can send a piece of prompting message to the terminal device bound with the central control device. The prompting message is used to inquire the user whether the user wants to download an application program corresponding to the smart home device. If the user selects to download an application program, then the central control device can request to download the application program corresponding to the smart home device from the cloud device.

Or, the central control device can download an application program corresponding to a smart home device from the cloud device automatically without participation of the user. One possible application scene is: after the connection between the central control device and the smart home device is completed, the central control device can request directly to download the application program corresponding to the smart home device from the cloud device.

For each downloaded application program, the central control device can install the downloaded application program locally.

In this way, the application programs corresponding to the smart home devices can be installed in the central control device, but do not need to be installed in the user's mobile phone as the same as the existing art, which saves the storage space of the mobile phone, so that the mobile phone can store more other useful information or be installed therein other application programs.

Optionally, in the embodiment of the present disclosure, before downloading from a cloud device and installing an application program corresponding to the smart home device, the central control device further establishes a second communication channel between the central control device and the cloud device based on a second communication module of the central control device.

That is, in order to obtain information from the cloud device, the central control device needs firstly to establish a communication channel with the cloud device. In the embodiment of the present disclosure, the communication channel between the central control device and the cloud device is called as the second communication device.

Further, in the embodiment of the present disclosure, after the step 102, the central control device further obtains the description information of the first control instruction from the cloud device through the second communication channel, wherein the description information of the first control instruction is produced by information processing of the cloud device after the cloud device receives sub description information of the first control instruction which is produced and sent to the cloud device by a terminal device which obtains a user's setup operation, and the terminal device establishes a binding relationship with the cloud device.

Optionally, in the embodiment of the present disclosure, the terminal device particularly establishes a binding relationship with the cloud device as follows: the terminal device establishes the binding relationship with the cloud device through a third communication module; the terminal device obtains an operation interface of the cloud device, the operation interface includes operation controls of a plurality of smart home devices; the operation controls of the plurality of smart home devices are configured to be provided to the user of the terminal device to operate; and the terminal device generates the sub description information of the first control instruction when the user performs the setup operation on a first operation control of the operation controls on the operation interface.

In the embodiment of the present disclosure, the communication module in the terminal device is called as the third communication module In the embodiment of the present disclosure, the cloud device can store a correspondence relationship between the terminal device and the central control device. If there are a plurality of central control devices, then the cloud device can store a correspondence relationship between each central control device and its corresponding terminal device. In this way, the cloud device can either determine a corresponding central control device according to the terminal device or determine a corresponding terminal device according to the central control device. That is, in the embodiment of the present disclosure, there is a correspondence relationship (or called as a binding relationship) among the terminal device, the cloud device and the central control device. For example, one cloud device can correspond to a plurality of central control devices, and each central control device can correspond to a plurality of terminal devices.

In the embodiment of the present disclosure, the terminal device can obtain the operation interface from the cloud device. The operation interface includes operation controls corresponding to a plurality of smart home devices, for example, one operation control is corresponding to one smart home device. The plurality of smart home devices can comprise the at least one smart home device. The user is able to control the plurality of home device by operating the operation interface.

At Step 103: when the central control device obtains description information of the first control instruction, the central control device generates a first control instruction based on a control logic of a first application program, and sends the first control instruction to a first smart home device corresponding to the first application program through the first communication channel so as to control the first smart home device to make a response. The description information of the first control instruction is used to represent a change of a device state of the first smart home device, and the central control device determines the first application program according to the description information of the first control instruction.

For example, the description information of the first control instruction is used to represent that the device state of the first smart home device is changed from OFF to ON; or, for example, the description information of the first control instruction is used to represent that the device state of the first smart home device is changed from ON to OFF; or, for example, the description information of the first control instruction is used to represent that a value of a first parameter of the first smart home device is adjusted from a first value to a second value, wherein the first parameter is any parameter of the first smart home device. For example, if the first smart home device is a smart air conditioner, then the first parameter may be temperature parameter, wind speed parameter, and wind direction parameter and so on; if the first smart home device is a smart fridge, then the first parameter may be refrigerator temperature parameter, freezer temperature parameter and so on. The first parameter is different depending on different smart home devices, to which the present disclosure does not make any limitation.

Optionally, in the embodiment of the present disclosure, upon receiving description information of the first control instruction, the central control device particularly generates the first control instruction based on the control logic of the first application program as follows: when the central control device obtains description information of the first control instruction, the central control device performs simulated operation on a first interactive interface of the first application program based on an operation logic of the first application program represented by the description information of the first control instruction, so that the first application program generates the first control instruction being capable of controlling the first smart home device to make a response according to the control logic of the first application program. The cloud device analyzes the sub description information of the first control instruction and obtains an intention of the setup operation of the user of the terminal device represented by the sub description information of the first control instruction when receiving the sub description information of the first control instruction, and converts the intention of the setup operation into the description information of the first control instruction which can be executed by the central control device to generate the first control instruction.

That is, the description information of the first control instruction is generated by the cloud device according to the operation logic of the central control device. The central control device can control directly the first application program according to the description information of the first control instruction upon receiving the description information of the first control instruction. In particular, the way that the central control device controls the first application program can be as follows: the central control device can call the first application program, and perform simulated operation on the first interactive interface corresponding to the first application program according to the operation logic corresponding to the description information of the first control instruction. Herein, it is called as the simulated operation because it is an operation that the central control device performs to simulate the operation of the user. For the first application program, it likes receiving the user's operation. In this way, after the central control device performs simulated operation on the first interactive interface, the first application program can generate the first control instruction according to the control logic of the first application program. After having received the first control instruction, the first smart home device can make a response to the first control instruction.

In particular, in the embodiment of the present disclosure, upon receiving the sub description information of the first control instruction, the cloud device looks up a central control device corresponding to the terminal device based on the sub description information of the first control instruction; the cloud device determines that the central control device is connected with the first smart home device being capable of responding to the first control instruction based on the sub description information of the first control instruction and the central control device; the cloud device obtains the first application program installed in the central control device to be used to control the first smart home device; the cloud device obtains an operation logic used by the first application program to generate the first control instruction; and the cloud device takes the operation logic used by the first application program to generate the first control instruction as the description information of the first control instruction.

In the embodiment of the present disclosure, the terminal device can obtain the operation interface from the cloud device. The user can control the plurality of smart home devices by operating the operation interface.

For example, the smart home device corresponding to a first operation control in the operation interface is a smart television. The user performs a first operation with respect to the first operation control, and the first operation is for example an operation for turning on the smart television. For example, in order to turn on the smart television, the smart television needs to execute the first control instruction. Then, the terminal device can generate the sub description information of the first control instruction after having received the first operation performed by the user, and the terminal device can send the sub description information of the first control instruction to the cloud device.

For example, the sub description information of the first control instruction carries identity information of the terminal device. Then, the cloud device can look up the central control device corresponding to the terminal device according to the sub description information of the first control instruction after having received the sub description information of the first control instruction.

After having looked up the central control device corresponding to the terminal device, the cloud device can determine according to the sub description information of the first control instruction and the central control device whether the central control device is connected with the smart television being capable of responding to the first control instruction. If the central control device fails to be connected with the smart television, then the cloud device can feed back a message of response failure to the terminal device, and thus the flow is ended.

If the central control device is connected with the smart television, then the cloud device can obtain the first application program installed in the central control device. The first application program is used to control the smart television. The cloud device can obtain operation logic of all the application programs installed in the respective central control devices supported by the cloud device. For one application program, its operation logic is as follows: this application program can generate what kind of control instruction through what kind of operation. Then, besides knowing the operation intention of the user represented by the sub description information of the first control instruction, the cloud device needs to know the operation logic corresponding to the first application program. In this way, the cloud device can convert the operation intention of the user into the operation logic that can be executed by the first application program. For example, if the description information of the first control instruction indicates that the user wants to turn on the smart television, then the cloud device needs to know the operation logic needed for the first application program for controlling the smart television to control to turn on the smart television, then the cloud device can take the operation logic needed for the first application program to control to turn on the smart television as the description information of the first control instruction.

Thus, the cloud device can send the description information of the first control instruction to the central control device. After having received the description information of the first control instruction, the central control device can call the first application program, and performs simulated operation on the first interactive interface based on the operation logic of the first application program represented by the description information of the first control instruction. In this way, the first application program can generate the first control instruction. Then, the central control device sends the first control instruction to the smart television, so as to control the smart television to respond the first control instruction. Finally, the smart television can be turned on.

Figure 2:
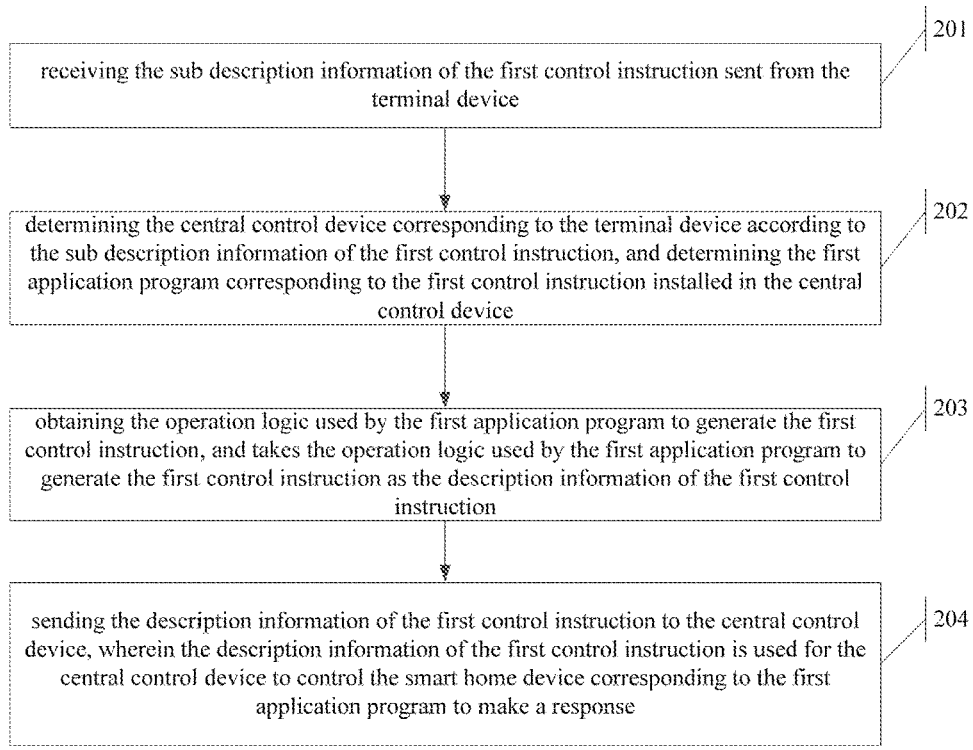
FIG. 2 is a major flowchart of an information processing method at a cloud device in an embodiment of the present disclosure.

Referring to FIG. 2, in the embodiment of the present disclosure, there is further provided another information processing method applicable to the cloud device. Major flows of the method are described as follows.

At Step 201: the cloud device receives the sub description information of the first control instruction sent from the terminal device.

At Step 202: the cloud device determines the central control device corresponding to the terminal device according to the sub description information of the first control instruction, and determines the first application program corresponding to the first control instruction installed in the central control device.

At Step 203: the cloud device obtains the operation logic used by the first application program to generate the first control instruction, and takes the operation logic used by the first application program to generate the first control instruction as the description information of the first control instruction.

At Step 204: the cloud device sends the description information of the first control instruction to the central control device. Then, the central control device controls the smart home device corresponding to the first application program to make a response according to the description information of the first control instruction. Here, the description information of the first control instruction is used to represent a change of device state of the first smart home device.

Herein, the specific operation processes in steps 201-204 have been described in the description for the flows of FIG. 1, and thus no further description is given herein.

Figure 3:
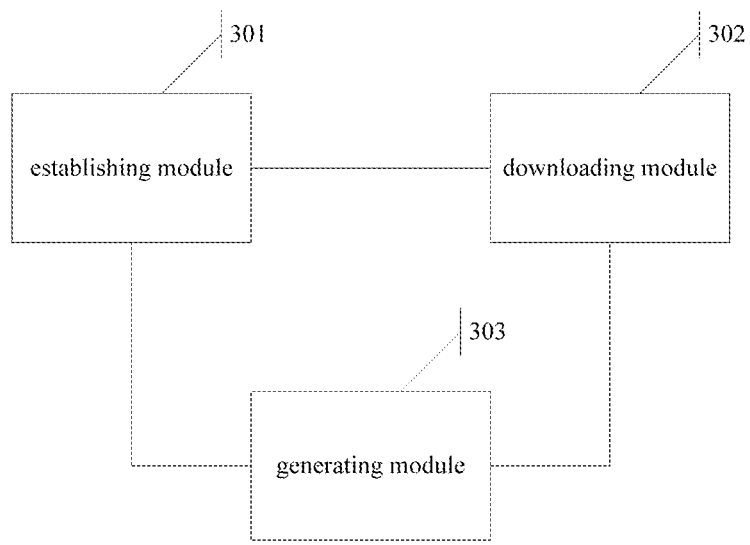
FIG. 3 is a block diagram of a major structure of a central control device in an embodiment of the present disclosure.

Referring to FIG. 3, based on the same inventive concept, in an embodiment of the present disclosure, there is provided a central control device. The central control device can comprise an establishing module 301, a downloading module 302 and a generating module 303.

The establishing module 301 is configured, for each of at least one smart home device, to establish a first communication channel between the central control device and the smart home device based on a first communication module of the central control device. In the embodiment of the present disclosure, each of the smart home devices has a first control mode and a second control mode; the first control mode is a control mode in response to receive a user operation, and the second control mode is a control mode in response to receive a control instruction sent by the central control device connected thereto.

The downloading module 302 is configured, for each of at least one smart home device, to download from a cloud device and install an application program corresponding to the smart home device.

The generating module 303 is configured to generate a first control instruction based on a control logic of a first application program when the central control device receives description information of the first control instruction, and send the first control instruction to a first smart home device corresponding to the first application program through the first communication channel so as to control the first smart home device to make a response. The description information of the first control instruction is used to represent a change of a device state of the first smart home device, and the central control device determines the first application program according to the description information of the first control instruction.

Optionally, in the embodiment of the present disclosure, the establishing module 301 is further configured to establish a second communication channel between the central control device and the cloud device based on a second communication module of the central control device before the downloading module 302 downloads from the cloud device and installs the application program corresponding to the smart home device.

The central control device further comprises an obtaining module configured to obtain the description information of the first control instruction from the cloud device through the second communication channel after the downloading module 302 downloads from the cloud device and installs the application program corresponding to the smart home device, wherein the description information of the first control instruction is produced by information processing of the cloud device after the cloud device receives sub description information of the first control instruction which is produced and sent to the cloud device by a terminal device which obtains a user's setup operation, and the terminal device establishes a binding relationship with the cloud device.

Optionally, in the embodiment of the present disclosure, the generating module 303 is configured to particularly generate a first control instruction based on a control logic of a first application program when the central control device obtains description information of the first control instruction by performing simulated operation on a first interactive interface of the first application program based on an operation logic of the first application program represented by the description information of the first control instruction when the obtaining module obtains description information of the first control instruction, so that the first application program generates the first control instruction being capable of controlling the first smart home device to make a response according to the control logic of the first application program. The cloud device analyzes the sub description information of the first control instruction and obtains an intention of the setup operation of the user of the terminal device represented by the sub description information of the first control instruction when receiving the sub description information of the first control instruction, and converts the intention of the setup operation into the description information of the first control instruction which can be executed by the central control device to generate the first control instruction.

Optionally, in the embodiment of the present disclosure, upon receiving the sub description information of the first control instruction, the cloud device looks up a central control device corresponding to the terminal device based on the sub description information of the first control instruction; the cloud device determines that the central control device is connected with the first smart home device being capable of responding to the first control instruction based on the sub description information of the first control instruction and the central control device; the cloud device obtains the first application program installed in the central control device to be used to control the first smart home device; the cloud device obtains an operation logic used by the first application program to generate the first control instruction; and the cloud device takes the operation logic used by the first application program to generate the first control instruction as the description information of the first control instruction.

Optionally, in the embodiment of the present disclosure, the terminal device particularly establishes a binding relationship with the cloud device as follows: the terminal device establishes the binding relationship with the cloud device through a third communication module; the terminal device obtains an operation interface of the cloud device, the operation interface includes operation controls of a plurality of smart home devices; the operation controls of the plurality of smart home devices are configured to be provided to the user of the terminal device to operate; and the terminal device generates the sub description information of the first control instruction when the user performs a first operation on a first operation control of the operation controls on the operation interface.

Figure 4:
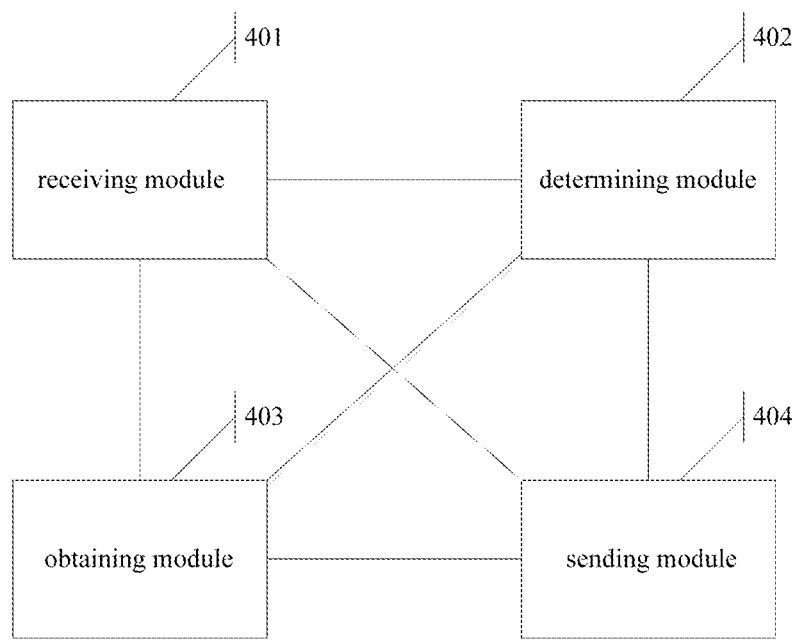
FIG. 4 is a block diagram of a major structure of a cloud device in an embodiment of the present disclosure.

Referring to FIG. 4, based on the same inventive concept, in an embodiment of the present disclosure, there is further provided a cloud device. The cloud device can comprise a receiving module 401, a determining module 402, an obtaining module 403 and a sending module 404.

The receiving module 401 is configured to receive the sub description information of the first control instruction sent from the terminal device.

The determining module 402 is configured to determine the central control device corresponding to the terminal device according to the sub description information of the first control instruction and determine the first application program corresponding to the first control instruction installed in the central control device.

The obtaining module 403 is configured to obtain the operation logic used by the first application program to generate the first control instruction and take the operation logic used by the first application program to generate the first control instruction as the description information of the first control instruction.

The sending module 404 is configured to send the description information of the first control instruction to the central control device. Then, the central control device controls the smart home device corresponding to the first application program to make a response according to the description information of the first control instruction. Here, the description information of the first control instruction is used to represent a change of device state of the first smart home device.

Figure 5:
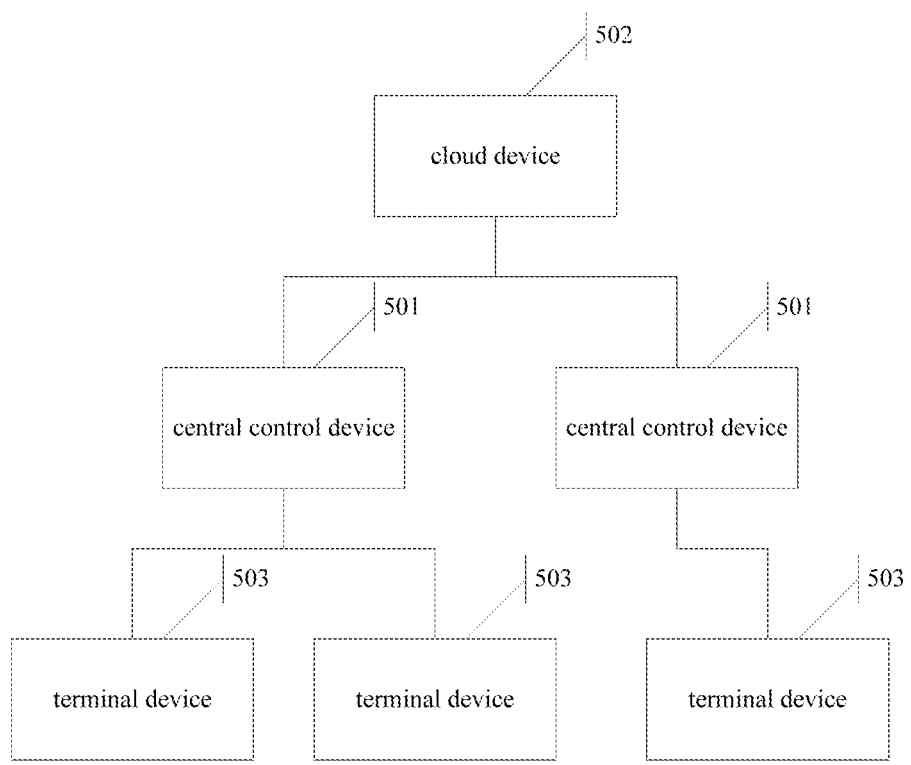
FIG. 5 is a schematic diagram of a major structure of an information processing system in an embodiment of the present disclosure.

Referring to FIG. 5, based on the same inventive concept, in an embodiment of the present disclosure, there is provided an information processing system. The information processing system comprises a central control device 501, a cloud device 502 and a terminal device 503. In an actual application, the system can comprise a plurality of cloud devices 502, each of the plurality of cloud devices 502 corresponds to at least one central control device 501, and each central control device 501 can correspond to at least one terminal device 503. In FIG. 5, it is taken as an example that the system has one cloud device 502 and two central control devices 501, one of the two central control devices 501 corresponds to two terminal devices 503 and the other central control device corresponds to one terminal device 503.

The central control device 501 is configured, for each of at least one smart home device, to establish a first communication channel between the central control device 501 and the smart home device based on a first communication module of the central control device 501, download from the cloud device 502 and install an application program corresponding to the smart home device, and generate a first control instruction based on a control logic of a first application program when receiving description information of the first control instruction, send the first control instruction to a first smart home device corresponding to the first application program through the first communication channel so as to control the first smart home device to make a response. Here, the description information of the first control instruction is used to represent a change of a device state of the first smart home device, and the central control device determines the first application program according to the description information of the first control instruction. Here, each of the at least one smart home device has a first control mode and a second control mode, the first control mode is a control mode in response to receive a user operation, and the second control mode is a control mode in response to receive a control instruction sent by the central control device 501 connected thereto.

The cloud device 502 is configured to receive the sub description information of the first control instruction sent from the terminal device 503, determine the central control device corresponding to the terminal device 503 according to the sub description information of the first control instruction and determine the first application program corresponding to the first control instruction installed in the central control device 501, obtain the operation logic used by the first application program to generate the first control instruction and take the operation logic used by the first application program to generate the first control instruction as the description information of the first control instruction, and send the description information of the first control instruction to the central control device 501. Then, the central control device 501 controls the smart home device corresponding to the first application program to make a response according to the description information of the first control instruction.

The terminal device 503 is configured to send the sub description information of the first control instruction to the cloud device 502 through the operation interface, wherein the sub description information of the first control is used to represent the user's intention of the setup operation with respect to the first smart home device.

The specific functions and tasks needed to be completed by the central control device 501, the cloud device 502 and the terminal device 503 have been introduced with reference to FIGS. 1-4, and thus no further description is given herein.

In the embodiments of the present disclosure, there is provided an information processing method applicable to a central control device, the information processing method comprises: for each of at least one smart home device, establishing a first communication channel between the central control device and the smart home device based on a first communication module of the central control device; for each of the at least one smart home device, downloading from a cloud device and installing an application program corresponding to the smart home device; and generating a first control instruction based on a control logic of a first application program when obtaining description information of the first control instruction; and sending the first control instruction to a first smart home device corresponding to the first application program through the first communication channel so as to control the first smart home device to make a response. Here, the description information of the first control instruction is used to represent a change of a device state of the first smart home device, and the central control device determines the first application program according to the description information of the first control instruction. Here, each of the smart home devices has a first control mode and a second control mode, the first control mode is a control mode in response to receive a user operation, and the second control mode is a control mode in response to receive a control instruction sent by the central control device connected thereto.

The control central in the embodiment of the present disclosure can download from the cloud device and installs the application programs corresponding to the respective smart home devices, that is, the application programs corresponding to the smart home devices can be installed in the central control device. For example, the central control device may be a smart router or may be other devices, so that it does not need to install the application documents corresponding to the smart home devices in the mobile phone, which saves the storage space of the mobile phone greatly. At the same time, the central control device generally has a relatively large storage space, and can be installed many application programs corresponding to the smart home devices, which is more convenient for the user's use.

In addition, when receiving the description information of the first control instruction, the central control device can generate automatically the first control instruction based on the control logic of the first application program, and send the first control instruction to the corresponding first smart home device so as to control the first smart home device to make a response. That is, after the application programs corresponding to the smart home devices are installed in the central control device, the smart home device can be controlled through the central control device, and the smart home appliances can be controlled normally as the same as the way when installing the application programs in the mobile phone.

Those skilled in the art can clearly know that the description is only provided by taking the division of the above respective functional modules as an example for the purpose of convenient and brief description. In the actual application, the above functions can be assigned to different functional modules to be completed according to the requirements, i.e., dividing the internal structure of the device into different functional modules so as to complete all or part of functions described above. The specific operating process of the system, apparatuses and units described above can refer to the corresponding process in the previous process embodiments, and thus no further description is given herein.

It shall be understood that in the several embodiments provided in the present disclosure, the systems, apparatuses and methods disclosed can be implemented in other ways. For example, the apparatus embodiments described above is just for illustration. For example, the division of the modules or units is just a division of logical functions. There may be other division modes in the actual implementation, for example, a plurality of units or components can be combined or integrated into another system, or some features can be omitted, or not performed. In addition, the mutual coupling or direct coupling or communication connection displayed or discussed can be indirect coupling or communication connection of the apparatuses or units via some interfaces, or can be electrical, mechanical or other forms.

A unit described as a separate component may be or may not be separated physically, and a component displayed as a unit may be or may not be a physical unit, that is, it can be arranged at a place, or can be distributed over a plurality of network units. A part or all of the units can be selected to realize the purpose of the solution of the embodiment according to the actual requirements.

In addition, the respective functional units in the respective embodiments of the present application may be integrated in one processing unit, or may be separate and physical existence of respective units, or may be that two or more units are integrated into one unit. The above integrated units may be implemented either in a form of a hardware or in a form of a software functional module.

If the integrated units are implemented in a form of a software functional unit and are sold or used as independent produces, they can be stored in a computer readable storage medium. Based on such understanding, the technical solution of the present application or the part of the technical solution contributing to the prior art or all or part of the technical solution can be reflected in a form of a software product in substance. The computer software product is stored in a storage medium, and comprises several instructions used for enabling a computer device (it may be a personal computer, a server or a network device and so on) or a processor to execute all or part of the steps of the methods described in the respective embodiments of the present application. The above storage medium comprises various media that can store program codes, such as a USB disk, a mobile hardware, a read-only memory (ROM), a random access memory (RAM), a magnetic disk or an optical disk and so on.

In particular, computer program instructions corresponding to the information processing method in the embodiment of the present disclosure can be stored in the storage medium such as an optical disk, a hardware disk and a USB disk and so on. When the computer program instructions corresponding to the determining method of the information processing method in the storage medium are read or executed by an electronic device, following steps are implemented: for each of at least one smart home device, establishing a first communication channel between the central control device and the smart home device based on a first communication module of the central control device; for each of the at least one smart home device, downloading from a cloud device and installing an application program corresponding to the smart home device; and generating a first control instruction based on a control logic of a first application program when obtaining description information of the first control instruction; and sending the first control instruction to a first smart home device corresponding to the first application program through the first communication channel so as to control the first smart home device to make a response. Here, the description information of the first control instruction is used to represent a change of a device state of the first smart home device, and the central control device determines the first application program according to the description information of the first control instruction. Here, each of the smart home devices has a first control mode and a second control mode; the first control mode is a control mode in response to receive a user operation, and the second control mode is a control mode in response to receive a control instruction sent by the central control device connected thereto.

Optionally, when the computer program instructions corresponding to the determining method of the information processing method in the storage medium are read or executed by an electronic device, before downloading from a cloud device and installing an application program corresponding to the smart home device, the following step is further implemented: establishing a second communication channel between the central control device and the cloud device based on a second communication module of the central control device.

When the computer program instructions corresponding to the determining method of the information processing method in the storage medium are read or executed by an electronic device, after downloading from a cloud device and installing an application program corresponding to the smart home device, the following step is further implemented: obtaining the description information of the first control instruction from the cloud device through the second communication channel, wherein the description information of the first control instruction is produced by information processing of the cloud device after the cloud device receives sub description information of the first control instruction which is produced and sent to the cloud device by a terminal device which obtains a user's setup operation, and the terminal device establishes a binding relationship with the cloud device.

Optionally, the step of generating a first control instruction based on a control logic of a first application program when the central control device obtains description information of the first control instruction in particular comprises: performing simulated operation on a first interactive interface of the first application program based on an operation logic of the first application program represented by the description information of the first control instruction when the central control device obtains the description information of the first control instruction, so that the first application program generates the first control instruction being capable of controlling the first smart home device to make a response according to a control logic of the first application program. The cloud device analyzes the sub description information of the first control instruction and obtains an intention of the setup operation of the user of the terminal device represented by the sub description information of the first control instruction when receiving the sub description information of the first control instruction, and converts the intention of the setup operation into the description information of the first control instruction which can be executed by the central control device to generate the first control instruction.

Optionally, upon receiving the sub description information of the first control instruction, the cloud device looks up a central control device corresponding to the terminal device based on the sub description information of the first control instruction; the cloud device determines that the central control device is connected with the first smart home device being capable of responding to the first control instruction based on the sub description information of the first control instruction and the central control device; the cloud device obtains the first application program installed in the central control device to be used to control the first smart home device; the cloud device obtains an operation logic used by the first application program to generate the first control instruction; and the cloud device takes the operation logic used by the first application program to generate the first control instruction as the description information of the first control instruction.

Optionally, the terminal device particularly establishes a binding relationship with the cloud device as follows: the terminal device establishes the binding relationship with the cloud device through a third communication module; the terminal device obtains an operation interface of the cloud device, the operation interface includes operation controls of a plurality of smart home devices; the operation controls of the plurality of smart home devices are configured to be provided to the user of the terminal device to operate; and the terminal device generates the sub description information of the first control instruction when the user performs a first operation on a first operation control of the operation controls on the operation interface.

The above embodiments describe the technical solution of the present application in detail, but the description of the above embodiments is only used for understanding the method of the present disclosure and its core concept rather than being understood as limiting the present disclosure. Any alternation or replacement easily conceivable for those skilled in the art within the technical scope of the present disclosure shall fall into the protection scope of the present disclosure.

The invention claimed is:

1. An information processing method, comprising:
   establishing a first communication channel between a central control device and at least one smart home device through a first communication module of the central control device;
   downloading from a cloud device and installing an application program corresponding to the at least one smart home device in the central control device;
   generating a first control instruction based on a control logic of a first application program upon obtaining description information of the first control instruction; and
   sending the first control instruction to a first smart home device corresponding to the first application program through the first communication channel so as to control the first smart home device to respond, wherein the description information of the first control instruction indicates changing a state of the first smart home device,
   wherein the description information of the first control instruction is generated upon the cloud device receiving sub description information of the first control instruction from a terminal device and processing the sub description information, the sub description information comprises information corresponding to user's operation on the terminal device and that indicates an intent of user's operation on the terminal device, and the description information of the first control instruction indicates an operation logic of the first application program.

2. The information processing method according to claim 1, wherein,
   before downloading from the cloud device and installing the application program corresponding to the at least one smart home device, establishing a second communication channel between the central control device and the cloud device through a second communication module of the central control device; and
   after downloading from the cloud device and installing the application program corresponding to the at least one smart home device, obtaining the description information of the first control instruction from the cloud device through the second communication channel.

3. The information processing method according to claim 2, wherein the generating a first control instruction based on a control logic of a first application program upon obtaining description information of the first control instruction comprises:
   operating on a first interactive interface of the first application program based on an operation logic indicated by the description information of the first control instruction, so as to control the first application program to generate the first control instruction for controlling the first smart home device according to a control logic of the first application program.

4. The information processing method according to claim 3, wherein the description information of the first control instruction is generated by:
   upon receiving the sub description information of the first control instruction, the cloud device analyzes and obtains an intention of user's operation on the terminal device indicated by the sub description information, and converts the intention of the operation into the description information executable by the central control device to generate the first control instruction.

5. The information processing method according to claim 4, wherein the description information of the first control instruction is generated by:

upon receiving the sub description information of the first control instruction, the cloud device searches for a central control device corresponding to the terminal device based on the sub description information;

the cloud device determines that the central control device is connected with the first smart home device capable of responding to the first control instruction, based on the sub description information and the central control device;

the cloud device obtains the first application program installed on the central control device for controlling the first smart home device;

the cloud device obtains an operation logic of the first application program for generating the first control instruction; and the cloud device generates the description information of the first control instruction according to the operation logic of the first application program.

6. The information processing method according to claim 2, further comprising:

establishing communication between the cloud device and the terminal device;

the terminal device obtaining an operation interface of the cloud device that includes widgets corresponding to a plurality of smart home devices for user's operation; and the terminal device generating the sub description information of the first control instruction in response to a first operation in relation to a first widget on the operation interface.

7. An information processing system, comprising:

a central control device comprising:

a memory, for storing a computer program thereon; and a processor, when executing the computer program, the following processes are achieved:

establishing a first communication channel with at least one smart home device;

establishing a second communication channel with a cloud device;

downloading from the cloud device and install an application program corresponding to the at least one smart home device; and generating a first control instruction based on a control logic of a first application program upon receiving description information of the first control instruction, and sending the first control instruction to a first smart home device corresponding to the first application program through the first communication channel so as to control the first smart home device to respond, wherein the description information of the first control instruction indicates changing a state of the first smart home device and is generated upon the cloud device receiving sub description information of the first control instruction from a terminal device and processing the sub description information, the sub description information comprises information corresponding to user's operation on the terminal device and indicates an intention of user's operation on the terminal device and the description information of the first control instruction indicates an operation logic of the first application program.

8. The information processing system according to claim 7, when executing the computer program, the following steps are achieved obtaining the description information of the first control instruction from the cloud device through the second communication channel.

9. The information processing system according to claim 8, wherein generating a first control instruction further comprises operating on a first interactive interface of the first application program based on an operation logic indicated by the description information of the first control instruction so as to control the first application program to generate the first control instruction for controlling the first smart home device according to a control logic of the first application program.

10. The information processing system according to claim 9, wherein the description information of the first control instruction comprises information generated by, upon receiving the sub description information of the first control instruction, the cloud device analyzing and obtaining an intention of user's operation on the terminal device indicated by the sub description information, and converting the intention of the operation into the description information executable by the central control device to generate the first control instruction.

11. The information processing system according to claim 9, wherein the description information of the first control instruction comprises information generated by:

upon receiving the sub description information of the first control instruction, the cloud device searching for a central control device corresponding to the terminal device based on the sub description information;

the cloud device determining that the central control device is connected with the first smart home device capable of responding to the first control instruction, based on the sub description information of the first control instruction and the central control device;

the cloud device obtaining the first application program installed on the central control device for controlling the first smart home device;

the cloud device obtaining an operation logic of the first application program for generating the first control instruction; and the cloud device generating the description information of the first control instruction according to the operation logic of the first application program.

* * * * *